J. SCHMID, Jr.
AIR BRAKE PUMP.
APPLICATION FILED SEPT. 26, 1910. RENEWED MAY 9, 1914.

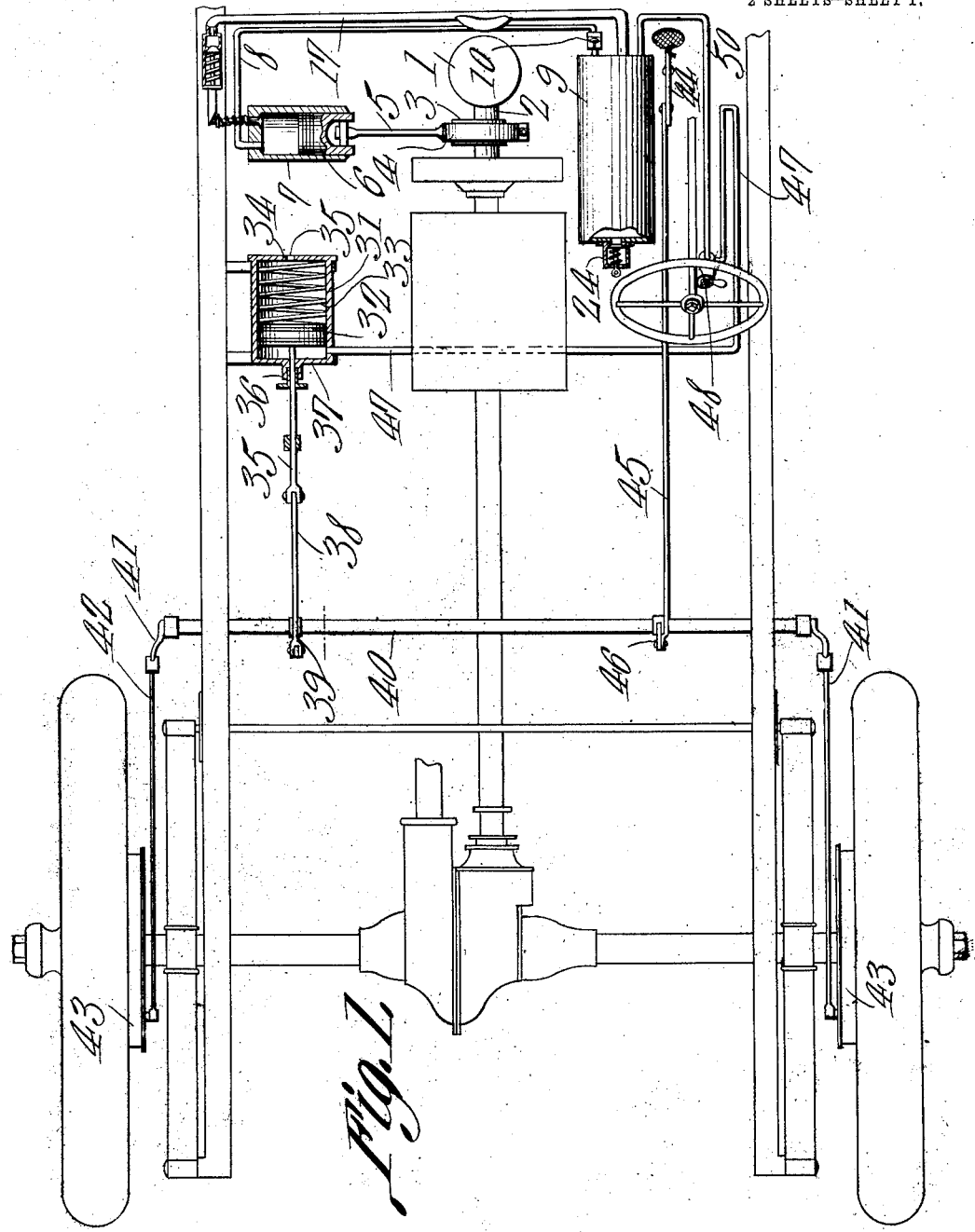

1,100,328.

Patented June 16, 1914.

2 SHEETS—SHEET 2.

John Schmid, Jr.,
Inventor

Witnesses:

by C. A. Snow & Co.
Attorneys.

UNITED STATES PATENT OFFICE.

JOHN SCHMID, JR., OF KANSAS CITY, MISSOURI.

AIR-BRAKE PUMP.

1,100,328. Specification of Letters Patent. Patented June 16, 1914.

Application filed September 26, 1910, Serial No. 583,863. Renewed May 9, 1914. Serial No. 837,582.

*To all whom it may concern:*

Be it known that I, JOHN SCHMID, Jr., a citizen of the United States, residing at Kansas City, in the county of Jackson and State of Missouri, have invented a new and useful Air-Brake Pump, of which the following is a specification.

This invention relates generally to air brake pumps, and particularly to one adapted for use on automobiles.

The object of the invention is to provide an air brake that shall be constructed in such a manner as to permit of its being applied to a machine already in use, without necessitating any change in the structural arrangement of the latter, and in which the parts shall be so disposed as not to interfere with the engine and other parts of the machine.

A further object is to provide a novel means for controlling the pressure in the air reservoir, and for regulating the supply of air to the air brake cylinder, whereby the brakes may be applied with any degree of power desired.

With the above and other objects in view, as will appear as the nature of the invention is better understood, the same consists in the novel construction and combination of parts of an air brake for automobiles, as will hereinafter be fully described and claimed.

Figure 3:
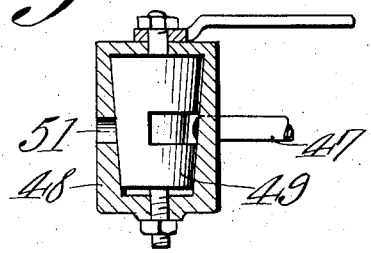
Figure 7:
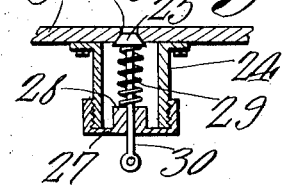
Figure 4:
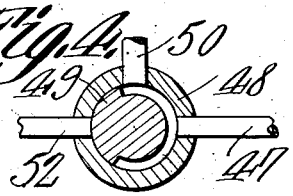
Figure 2:
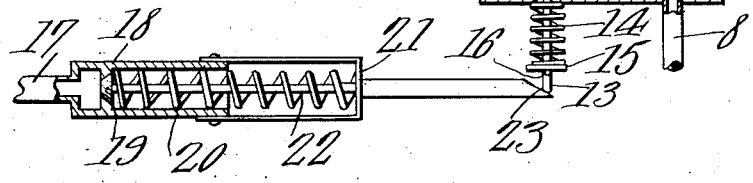
Figure 5:
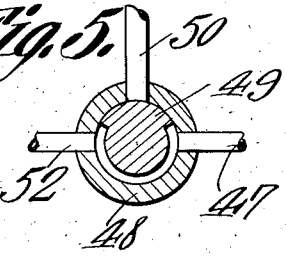
Figure 6:
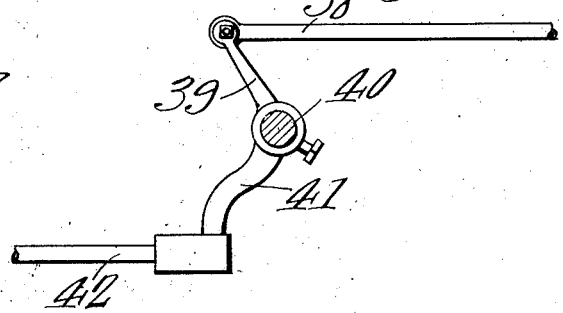

In the accompanying drawings forming a part of this specification, and in which like characters of reference indicate corresponding parts: Figure 1 is a plan view of a portion of an automobile, displaying the air brake mechanism applied thereto, the view being somewhat diagrammatic in character. Fig. 2 is an enlarged detail sectional view of the mechanism for controlling the pressure in the air reservoir. Fig. 3 is a sectional detail view of the three-way valve that controls the supply of air to the brake cylinder. Figs. 4 and 5 are sectional views, showing the different positions of the valve when admitting air to or cutting it off from the brake cylinder. Fig. 6 is a detail view, on an enlarged scale, of the lever connection between the air cylinder and the brake beam. Fig. 7 is a sectional detail view of a relief valve used in conjunction with the air reservoir.

Referring to the drawings, 1 designates the engine which may be of any preferred type, on the shaft 2 of which is mounted an eccentric 3, and while not shown it is to be understood that this eccentric will be split so as to permit of its being secured to the shaft without dismantling the engine. Mounted upon the eccentric is a strap 4 with which connects one end of an eccentric rod 5, the other end of which is combined, in any preferred manner, with a piston 6 of the compression chamber 7, the latter being connected by a pipe 8 with the air reservoir 9. The pipe is provided near the reservoir with a back pressure valve 10, the function of which is to prevent the air in the reservoir from returning to the compression chamber.

One of the essential features of the present invention is the provision of a novel form of relief valve for preventing excessive or dangerous pressure in the air reservoir, and also to permit the compressor to suck in air so long as the pressure is up, thus to cool the water in the jacket and thereby avoid waste by evaporation. This valve mechanism, which is shown in detail in Fig. 2, consists of an inwardly opening spring pressed valve 11 that is carried by the head of the compression chamber, and controls the passage through a port 12. The stem 13 of the valve projects some distance beyond the head of the compression chamber and carries a coiled spring 14, one end of which bears against the chamber head and the other end against a stop disk 15 which is held against disconnection from the stem by a pin 16. The stress of the spring 14 will operate normally to maintain the valve 11 in its seated position, but will not be of a strength to resist unseating on the suction stroke of the piston of the compressor, so that as long as the pressure is normal, air at each stroke of the compression piston will be forced through the pipe 8 to the air reservoir. When the pressure in the air reservoir becomes excessive, the air passes therefrom through the pipe 17 to a casing 18 located adjacent to the compression cylinder and at right angles thereto, the casing having therein a valve 19 that is held normally seated by a coiled spring 20, one end of which bears against the valve 19 and the other against the head 21 of a yoke carried by the casing. The valve has a shank 22 that projects beyond the casing and has its outer end beveled at 23, and is so arranged that when the valve 19 is unseated by pressure from the air in the air reservoir the beveled end 23 will contact with the end of the shank 13 and unseat the valve 11, thus cutting off any further supply of air to the reservoir until the pressure therein drops to a point that will permit the valve 19 to seat, whereupon the valve 11 will seat and the operation of the compressor will again be resumed.

As there might be a remote possibility that under some conditions the relief device just described would fail to act, provision is made whereby in such event a second safety or emergency relief valve combined with the air reservoir will come into play. This valve is shown in detail in Fig. 7, and comprises a cylinder 24 that is secured to the inner end of the reservoir and contains a valve 25 that controls passage through a port 26 in the bottom of the chamber. The exterior of the lower portion of the cylinder is threaded and is engaged by a cap 27, that is provided with a boss 28 designed to engage with a coiled spring 29 mounted on the stem 30 of the valve, the latter projecting through and beyond the boss. The object of this cap is to regulate the tension of the spring as may be desired, so as to cause the valve to open at substantially the same pressure that will cause the automatic device above described to become operative. Thus there is provided a double means for relieving the air reservoir of excessive pressure so that safety of operation under all conditions will be assured.

The air brake cylinder 31 contains the usual piston 32 and is borne upon by one end of a coiled spring 33, the other end of which bears against the cylinder head 34, the latter being provided with a vent 35 to prevent the formation of an air cushion. Connected with the piston is a piston rod 35, which works in a gland 36 carried by the cylinder head. The outer end of the piston rod is pivotally connected with one end of a rod 38, the other end of which connects with an arm 39 rigid with the brake beam 40. At each end of the brake beam is an arm 41, the two arms being disposed at an angle to the arm 39, and are connected with rods 42 attached to the brake bands 43.

In the event that the air brake should fail to work from any cause, the ordinary foot brake could be employed, this consisting of a lever 44 fulcrumed on the front platform of the car and to which is pivotally connected one end of a rod 45, the other end of which is pivotally connected to an arm 46 rigid with the brake beam.

Air is supplied to the cylinder 31 through a pipe 47 that connects with the casing 48 of a two-way valve 49 provided with an ordinary operating handle. Connected with the other side of the valve casing is one end of the pipe 50, the other end of which is tapped into the air reservoir 9. The valve casing is also provided with an exhaust port 51, which may have threaded into it the discharge pipe 52 if desired. When the valve 49 is in position as shown in Fig. 4, air passes from the reservoir to the air brake cylinder, and applies the brakes, but when the valve is moved to the position shown in Fig. 5 the supply of air is cut off to the air brake cylinder and that contained therein is allowed to escape through the exhaust port.

It will be seen from the foregoing description that by the employment of the valve 12 and the valve shank 22 which coacts with the stem of the valve 12, that all danger of the reservoir becoming surcharged will be prevented, and as the action is automatic, no care devolves upon the chauffeur to see that the valve operates. In the event, however, that the release mechanism just spoken of should fail of operation, then that shown on the air reservoir would come into play.

It is to be understood that the invention is not to be limited to the precise arrangement of the parts as herein shown, as Fig. 1 is practically a diagram showing one manner in which the various operating parts could be disposed on the chassis of an automobile.

I claim:

1. In a pressure controlled pump the combination of a pressure reservoir, a compression chamber communicating therewith, a spring controlled inlet valve therein; a pressure relief valve communicating with said pressure reservoir, a valve stem secured to and operated by said pressure relief valve, the end of said stem adapted to contact with and unseat said inlet valve when the said pressure relief valve is operated by an excess pressure.

2. In a pressure controlled pump the combination of, a pressure reservoir, a compression chamber communicating therewith, an automatic compression chamber inlet valve, a pressure relief valve communicating with said pressure reservoir and juxtaposed said automatic compression chamber inlet valve, the valve stem of said pressure relief valve adapted to unseat said automatic compression chamber inlet valve when said pressure relief valve is actuated by an excess pressure.

3. In a pressure controlled pump the combination of a pressure reservoir, a compression chamber communicating therewith, a back pressure valve disposed between said compression chamber and said reservoir, a spring controlled inwardly opening inlet valve in said compression chamber, the stem thereof extending beyond the outside wall of said compression chamber, a pressure relief valve communicating with said pressure reservoir and juxtaposed said compression chamber inlet valve, the end of said pressure relief valve stem beveled and in contact with said inlet valve stem, said pressure relief valve stem adapted to unseat said compression chamber inlet valve when said pressure relief valve is opened by an excess pressure.

4. In a pressure system the combination of a pressure reservoir, a compression chamber communicating therewith, a back pressure valve disposed between said compression chamber and said pressure reservoir, a spring controlled inwardly opening inlet valve in said compression chamber, a pressure relief valve communicating with said pressure reservoir and juxtaposed said compression chamber inlet valve, the valve stem of said pressure relief valve extending at right angles to and contacting with the valve stem of said compression chamber inlet valve, said pressure relief valve adapted to relieve said pressure reservoir of excess pressure, and further adapted to unseat said compression chamber inlet valve to thereby cut off further pressure supply from said compression chamber to said pressure reservoir.

5. In a pressure controlled system the combination of a pressure reservoir, a compression chamber communicating therewith, a back pressure valve disposed between said compression chamber and said pressure reservoir, an inwardly opening compression chamber inlet valve, a pressure relief valve communicating with said pressure reservoir and juxtaposed said compression chamber, said relief valve provided with an elongated valve stem the remote end thereof being beveled, said pressure relief valve stem adapted to contact with said compression chamber inlet valve stem, said pressure relief valve adapted to unseat said compression chamber inlet valve and to hold the same in open position during an excess pressure in said pressure reservoir, said pressure relief valve also adapted to provide an escape for said reservoir excess pressure.

In testimony that I claim the foregoing as my own, I have hereto affixed my signature in the presence of two witnesses.

JOHN SCHMID, Jr.

Witnesses:
CHAS. H. DEFENBACH,
SAMUEL H. COPE.